March 1, 1927.                    F. A. BEST                    1,619,182
                          CONVERTIBLE VEHICLE BODY
                    Filed Aug. 25, 1924        3 Sheets-Sheet 3
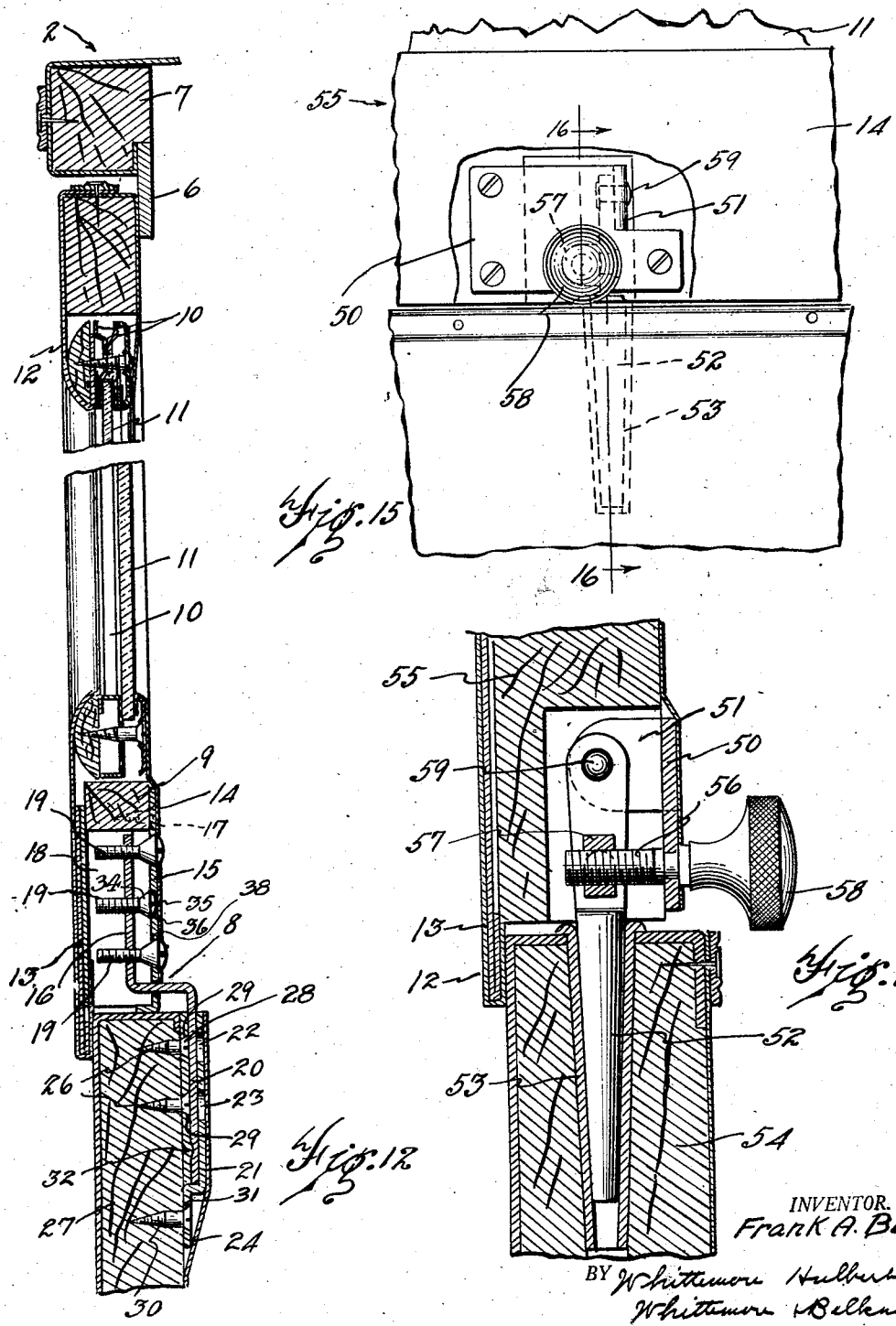
INVENTOR.
Frank A. Best
BY Whittemore Hulbert
Whittemore Belknap
ATTORNEYS Patented Mar. 1, 1927.

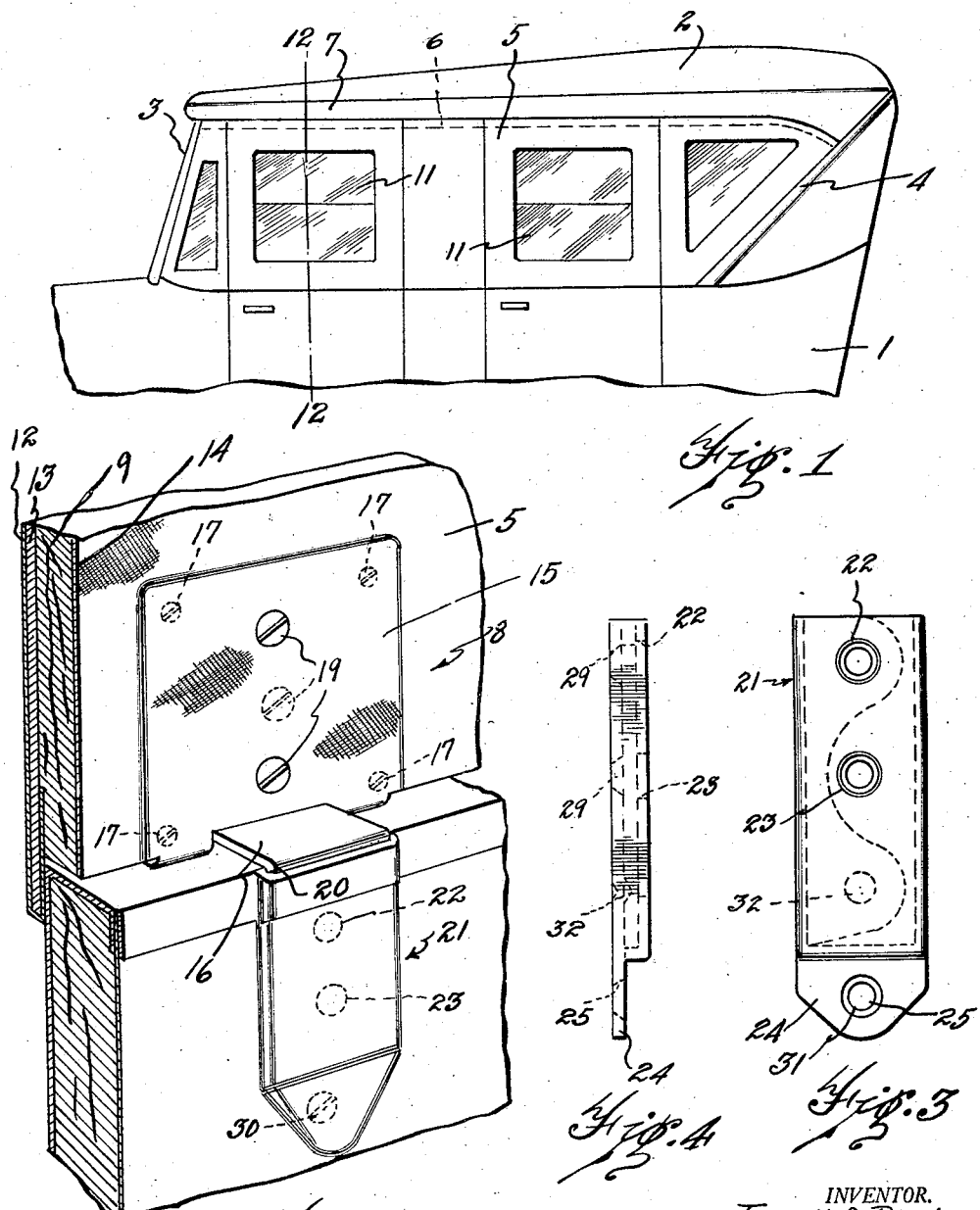

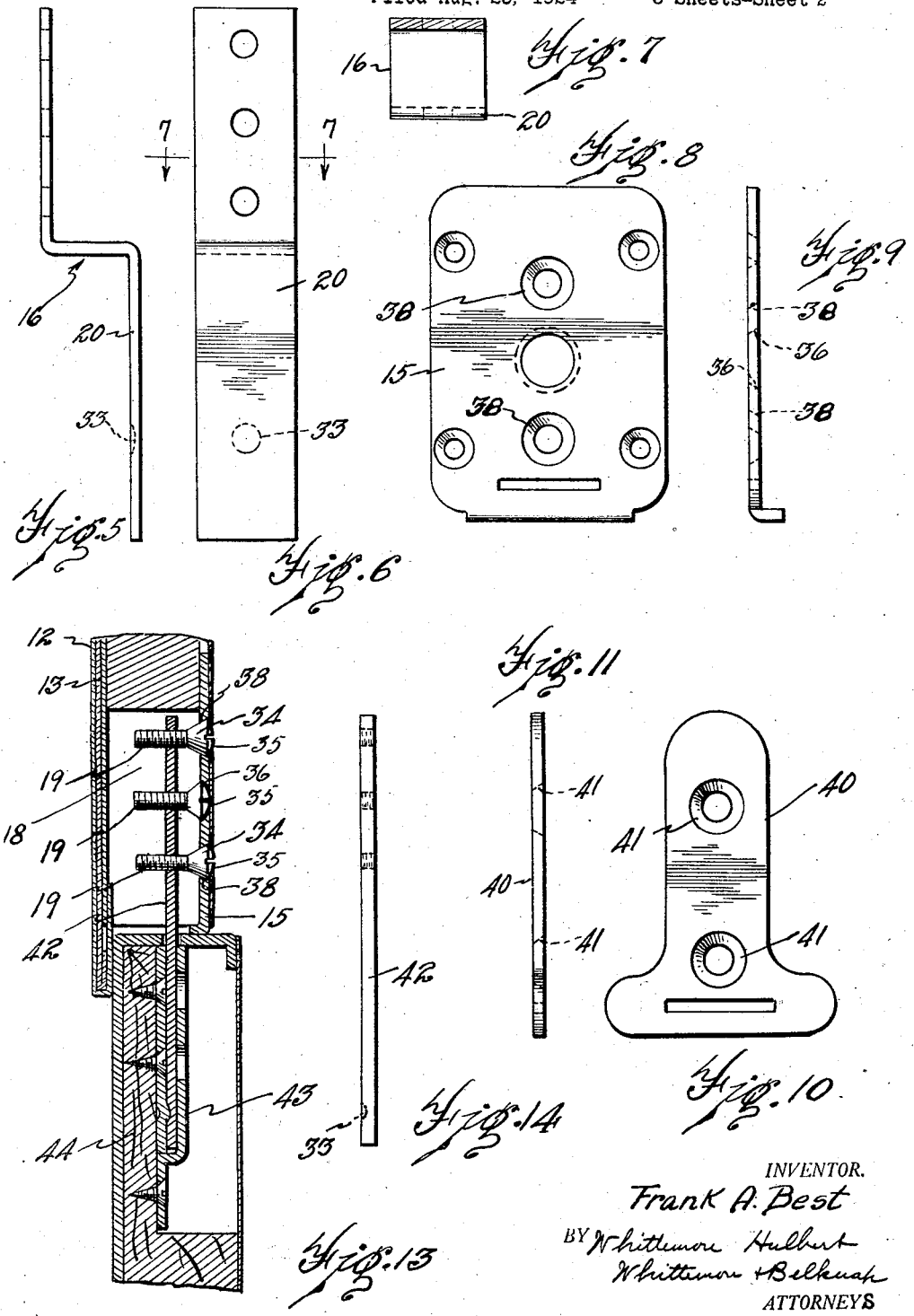

1,619,182

UNITED STATES PATENT OFFICE.

FRANK A. BEST, OF FORD, ONTARIO, CANADA, ASSIGNOR TO AMERICAN AUTO TRIMMING COMPANY, OF DETROIT, MICHIGAN, A CORPORATION OF MICHIGAN.

CONVERTIBLE VEHICLE BODY.

Application filed August 25, 1924. Serial No. 734,076.

This invention relates generally to convertible vehicle bodies and consists of certain novel features of construction, combinations and arrangements of parts as will be more fully described and particularly pointed out in the appended claims.

In the accompanying drawings;

Figure 1 is a fragmentary side elevation of a vehicle embodying my invention;

Figure 2 is a perspective view of one of my brackets and showing the same connected to one of the window sections and to the body of the vehicle;

Figure 3 is a side elevation of one of the socket members;

Figure 4 is an end elevation of one of the socket members;

Figure 5 is an end elevation of one of the connecting bars;

Figure 6 is a front elevation of one of the connecting bars;

Figure 7 is a sectional view taken on the line 7—7 of Figure 6;

Figure 8 is a front elevation of one of the attaching plates.

Figure 9 is an end elevation of one of the attaching plates;

Figure 10 is a front elevation of one of the escutcheon plates;

Figure 11 is an end elevation of one of the escutcheon plates;

Figure 12 is a vertical sectional view taken on the line 12—12 of Figure 1;

Figure 13 is a vertical sectional view through a slightly modified form of construction;

Figure 14 is an end elevation of the connecting bar used in the construction shown in Figure 13;

Figure 15 is a front elevation of another modified form of construction.

Figure 16 is a sectional view taken on the line 16—16 of Figure 15.

Referring now to the drawing in which like characters of reference designate corresponding parts throughout the several views, the numeral 1 designates a vehicle body of the touring type having a suitable top 2 which is supported at its forward end on the usual windshield standards 3 projecting upwardly from the body at the forward end thereof and is connected at its rear end to a rearwardly inclined bow 4 that extends upwardly from the body at the rear end thereof.

For converting the touring body into a closed body I preferably provide a series of window sections or enclosures 5 which bear against suitable abutment flanges 6 projecting downwardly from the frame 7 of the top 2 and are preferably detachably secured to the vehicle body by means of the brackets 8. The window sections 5 may be any shape desired and may be constructed of any suitable material. As shown, each window section 5 is substantially square in shape and is preferably provided with a suitable wooden frame 9 in which the channel guides 10 for the glass panels 11 are located. Rubberized fabric 12 is preferably secured to the outer surface of the frame 9 and is preferably bent over the lower edge of a depending metal abutment flange 13 secured to the outer side of the frame 9 at the lower end thereof, while an ordinary cloth lining 14 is preferably secured to the inner face of the frame 9.

The brackets 8 preferably comprise the attaching plates 15 and the flat connecting bars 16. As shown, the attaching plates are preferably secured to the inner face of the frame 9 by means of the screws 17 while the connecting bars 16 preferably extend upwardly into suitable pockets 18 in the lower edge of the frame 9 and are secured to the inner face of the plates 15 by means of the screws 19.

When the window sections 5 are to be attached to a standard vehicle body of the touring type, the connecting bars 16 are preferably provided at their lower ends with off-set portions 20 which engage sockets 21 that are preferably secured to the inner sides of the vehicle body beneath the usual trimming material. As shown in Figures 3 and 4 of the drawing, each socket 21 is preferably provided with spaced aligned openings 22 and 23 respectively, and a depending extension 24 having an opening 25. With this construction, the screws 26 are inserted through the opening 22 and are driven into the wooden frame 27 of the vehicle body so that the heads of the screws engage the countersunk portions 29. A screw 30 is also inserted into the opening 25 in the extension 24 and is driven into the frame 27 so that the head 30 will engage the countersunk portion 31.

For limiting the insertion of the connecting bars 16 and also holding the same to prevent rattling there is a suitable retaining button 32 that extends inwardly from the back of each socket 21 and is engageable with a correspondingly shaped depression 33 in the offset portions of the bars 16. The sockets 21 may be formed of any suitable material but are preferably formed from sheet metal which is stamped and bent into the shape shown in Figures 3 and 4 of the drawing.

In order that the window sections 5 may be adjusted when the offset portions 20 of the connecting bars are in position in the sockets 21 to move the upper ends of the window sections in proper position against the abutment flanges 6 of the vehicle top, the heads 34 of the screws 19 are preferably substantially frustro-conical in shape and have rounded ends 35. As shown, the rounded ends 35 of the intermediate screws 19 preferably engage the countersunk portions 36 upon the inner face of the attaching plates 15 and form fulcrums for the connecting bars 16 while the tapered portions of the heads of the end screws 19 preferably engage the countersunk portions 38 in the outer face of the attaching plates 15 and permit the connecting bars 16 to rock on the intermediate fulcrums. Thus with this three point connection between the bars 16 and the plates 15, the upper ends of the window sections 5 may be readily adjusted inwardly or outwardly as desired with respect to the abutment flanges 6 of the top by adjusting the end screws 19. When the desired adjustment has been made, the intermediate screws 19 may then be adjusted firmly against the plates 15 to hold the bars 16 and window sections 5 in position. Moreover this three point connection obviates rattling entirely.

If desired, the attaching plates 15 may be secured directly to the woodwork of the frame 5 beneath the lining 14, and suitable escutcheon plates 40 may be placed over the lining 14 and secured to the attaching plates 15 by means of the end screws 19 which connect the bars 16 to the plates 15. With this construction, the escutcheon plates 40 are provided with the countersunk portions 41 corresponding to the countersunk portions in the attaching plates 15.

Should it be desired to equip new vehicle bodies with the window sections 5, I preferably provide straight connecting bars 42 which preferably engage sockets 43 embedded in the woodwork 44 of the vehicle body as shown in Figure 13 of the drawing. With this construction, the sockets 43 are similar in construction to the sockets 21 and the same adjustment of the window sections may be obtained.

Thus from the foregoing description, it will be readily apparent that I have provided very simple and practical internal adjustment means for the window sections 5 which may be used with vehicle bodies of different thicknesses. Inasmuch as the connecting bars are flat, it is possible to hide the sockets which are attached to the vehicle body under the inside trimming material. Thus there are no objectionable protruding parts of any kind and the whole construction is neat and attractive in appearance. When the sockets are placed in the woodwork of the vehicle body, the connecting bars and sockets are both entirely out of sight. Furthermore, the sockets are constructed in such a way that the upper ends of the window sections may be adjusted inwardly or outwardly with respect to the abutment flanges 6 of the vehicle top, while at the same time the connecting bars are prevented from working out of the sockets. However the window sections may be easily and quickly removed from the vehicle body without the use of any tools by merely giving the window sections quick upward jerks to remove the retaining buttons 32 from the depressions in the sockets. When the window sections are removed, the sockets may be engaged by the supporting rods (not shown) for the usual flexible side curtains of the vehicle.

In Figures 15 and 16 of the drawings I have shown a slightly modified form of construction wherein each attaching plate 50 is preferably provided at one end with inwardly extending ear 51 to which the connecting bar is preferably pivoted at its upper end. These connecting bars 52 are preferably tapered at their lower ends as shown and are adapted to fit within correspondingly shaped sockets 53 that are secured to the vehicle body 54. In order that the window sections 55 may be readily adjusted, I preferably provide a screw 56 that extends through each attaching plate 50 and threadedly engages a lug 57 on the connecting bars 52. This scew is preferably provided at its outer end with a handle 58 by which it may be rotated to effect the desired adjustment of the window section. Thus, with this construction, the pins 59 connecting the connecting bars 52 to the ears 51 on the attaching plates 50 form pivots for the window section, consequently the window sections may be adjusted very quickly by merely rotating the single screw 56 extending through each attaching plate 50.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. The combination with a vehicle body and a removable window section, of means for attaching said section to said body including a socket secured to the body, a plate rigidly secured to the section, a bar slidably engaging said socket, and an adjustable connection between the bar and plate capable of adjusting said window section relative to the vehicle body.

2. The combination with a vehicle body and a removable window section, of means for attaching said section to said body including a socket secured to the body, a plate rigidly secured to the section, a bar engaging said socket, means for detachably holding said bar in engagement with said socket, and means for adjusting said window section above said body including an element extending through said plate and threadedly engaging said bar.

3. The combination with a vehicle body and a removable window section having a rigid frame, of means for attaching said section to said body including a socket secured to the body, a plate rigidly secured to the frame of said section, a connecting member engaging the socket, and means for adjusting said section above said body including an element extending freely through said plate and threadedly engaging said connecting member.

4. The combination with a vehicle body, a removable window section, and a top for the body having an abutment flange for the window section, of means for attaching the section to the body including a socket secured to the body, a plate secured to the section, a bar engaging said socket, headed elements connecting said bar to said plate and adapted to adjust the latter with respect to the bar when the said bar is in engagement with the socket for moving the window section relative to the abutment flange of the top.

5. The combination with a vehicle body, a removable window section and a top for the body having an abutment flange for the window section, of means for attaching the section to the body including a socket secured to the body, a plate secured to the section, a bar engaging said socket, and headed elements for adjusting the plate relative to the bar for moving the window section relative to the abutment flange of the top.

6. The combination with a vehicle body, a removable window section, and a top for the body having an abutment flange for the window section, of means for attaching said section to said body including a socket secured to the body, a plate secured to the section, a bar engaging the socket, a fulcrum member for the plate carried by the bar, and means connecting the plate to the bar, said means being adjustable for rocking said plate upon said fulcrum member to adjust said window section relative to the abutment flange of the top.

7. The combination with a vehicle body, a removable window section, and a top for the body having an abutment flange for the window section, of means for attaching the section to the body including a socket carried by the body, a plate carried by the section, a bar engaging the socket, a fulcrum member carried by the bar, and headed elements carried by the plate and adjustable in the bar for rocking the plate on the fulcrum member for moving the window section relative to the abutment flange of the top.

8. The combination with a vehicle body and a removable window section, of means for attaching said section to said body including a socket secured to the body, an attaching plate secured to the section, a connecting bar engaging the socket, an escutcheon plate over the attaching plate aforesaid, and means for securing the escutcheon plate to the attaching plate aforesaid and adjustably connecting the said attaching plate to said bar.

9. The combination with a vehicle body and a removable window section, of means for attaching said section to said body including a socket secured to the body, a plate secured to the section, a bar connected to the plate and engageable with said socket, and means for adjusting said window section including a rotatable member engaging said plate and bar.

10. The combination with a vehicle body and a removable window section, of means for attaching said section to said body including a socket secured to the body, a plate rigidly secured to the window section, a bar slidably engaging the socket, a fulcrum for the plate carried by the bar, and a connection between said plate and bar capable of rocking said plate on said fulcrum to adjust said window section relative to said vehicle body.

11. In a vehicle, the combination with the spaced body and top thereof, of a window section between said body and top, and securing means for said window section including a socket secured to the body, an attaching plate secured to the window section, a bar engaging said socket, and means for adjusting the window section relative to said top including an element extending freely through said attaching plate and threadedly engaging said bar.

12. In a vehicle, the combination with the spaced body and top thereof, of a window section between said body and top, and securing means for said window section including a socket secured to the body, an attaching plate secured to the window section, a bar engaging said socket, a fulcrum for the window section carried by the bar, and means for adjusting the window section on the fulcrum including a rotatable element extending through the attaching plate and bar.

In testimony whereof I affix my signature.

FRANK A. BEST.